United States Patent
Turpin et al.

(10) Patent No.: US 11,888,228 B2
(45) Date of Patent: *Jan. 30, 2024

(54) PRISM FOR REPOINTING REFLECTOR ANTENNA MAIN BEAM

(71) Applicant: All.Space Networks Limited, Reading (GB)

(72) Inventors: Jeremiah P. Turpin, Linthicum, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,895

(22) Filed: Sep. 13, 2022

(65) Prior Publication Data

US 2023/0006358 A1 Jan. 5, 2023

Related U.S. Application Data

(63) Continuation of application No. 17/182,992, filed on Feb. 23, 2021, now Pat. No. 11,469,515.

(Continued)

(51) Int. Cl.
*H01Q 19/13* (2006.01)
*H01Q 5/55* (2015.01)
(Continued)

(52) U.S. Cl.
CPC ........... *H01Q 19/132* (2013.01); *H01Q 1/247* (2013.01); *H01Q 3/08* (2013.01); *H01Q 3/20* (2013.01);
(Continued)

(58) Field of Classification Search
CPC .... H01Q 15/02; H01Q 15/04; H01Q 15/0086; H01Q 15/08; H01Q 15/23; H01Q 19/08
See application file for complete search history.

(56) References Cited

U.S. PATENT DOCUMENTS 4,333,082 A * 6/1982 Susman ................. H01Q 19/06
343/754
4,531,129 A 7/1985 Bonebright et al.
(Continued)

FOREIGN PATENT DOCUMENTS

CN 2370427 3/2000
EP 0843381 5/1998
(Continued)

OTHER PUBLICATIONS

Thorlabs—XYT/M—A Post-Mountable Tweaker Plate, 2.5 mmThick, ARC: 350-700 nm, M4 Tap, 1999.
(Continued)

*Primary Examiner* — Daniel Munoz
(74) *Attorney, Agent, or Firm* — Wolf, Greenfield & Sacks, P.C.

(57) ABSTRACT

A microwave prism is used to repoint an operational Direct-to-Home (DTH) or Very Small Aperture Terminal (VSAT) reflector antenna as part of a ground terminal to receive (or transmit) signals from a different satellite or orbital position without physically moving the reflector or the feed horn antenna. The microwave prism operates by shifting the radiated fields from the horn antenna generally perpendicular to the focal axis of the parabolic reflector in order to cause the main beam of the reflector to scan in response. For an existing reflector antenna receiving signals from an incumbent satellite, a prism has been designed to be snapped into place over the feed horn and shift the fields laterally by a calibrated distance. The structure of the prism is designed to be positioned and oriented correctly without the use of skilled labor. This system allows a satellite service provider to repoint their subscribers to a new satellite by shipping a self-install kit of the prism that is pre-configured to have the correct orientation and position on the feed antenna to correctly re-point the beam at a different satellite once the (Continued)

prism is applied. One benefit of the system is that unskilled labor, i.e., the subscribers themselves, can be used to repoint a large number of subscriber antennas in a satellite network rather than requiring the cost of a truck roll and a technician to visit every site. The microwave prisms to implement this functionality can be constructed in different ways, with homogeneous slabs or blocks, Gradient-Index (GRIN), multi-layered dielectric, geometric or graded-index Fresnel-zone, metasurface, or metamaterial prisms. The geometric and electrical constraints of the design are determined by the incumbent and target satellites, and the ground terminal location.

18 Claims, 8 Drawing Sheets

Related U.S. Application Data

(60) Provisional application No. 62/981,367, filed on Feb. 25, 2020.

(51) Int. Cl.
| | |
|---|---|
| *H01Q 1/24* | (2006.01) |
| *H01Q 3/08* | (2006.01) |
| *H01Q 3/20* | (2006.01) |
| *H01Q 15/16* | (2006.01) |
| *H01Q 19/19* | (2006.01) |
| *H04B 7/185* | (2006.01) |
| *H01Q 15/04* | (2006.01) |

(52) U.S. Cl.
CPC .............. *H01Q 5/55* (2015.01); *H01Q 15/04* (2013.01); *H01Q 15/16* (2013.01); *H01Q 19/191* (2013.01); *H04B 7/18517* (2013.01)

(56) References Cited

U.S. PATENT DOCUMENTS

| | | | |
|---|---|---|---|
| 5,736,959 | A | 4/1998 | Patterson et al. |
| 6,075,497 | A | 6/2000 | Chen et al. |
| 6,087,999 | A | 7/2000 | Muhlhauser et al. |
| 6,107,897 | A | 8/2000 | Muhlhauser et al. |
| 6,160,520 | A | 12/2000 | Muhlhauser et al. |
| 6,181,293 | B1 | 1/2001 | Muhlhauser et al. |
| 6,218,853 | B1 | 4/2001 | Liu |
| 6,512,485 | B2 | 1/2003 | Luly et al. |
| 6,593,893 | B2 | 7/2003 | Hou et al. |
| 6,710,749 | B2 | 3/2004 | King |
| 6,864,846 | B2 | 3/2005 | King |
| 6,864,850 | B2 | 3/2005 | Imaizumi et al. |
| 6,933,903 | B2 | 8/2005 | Petersson |
| 6,999,035 | B2 | 2/2006 | Matsumoto et al. |
| 7,061,448 | B2 | 6/2006 | Kuroda et al. |
| 7,221,328 | B2 | 5/2007 | Kuroda et al. |
| 7,236,681 | B2 | 6/2007 | Moheb et al. |
| 7,342,551 | B2 | 3/2008 | King |
| 7,348,934 | B2 | 3/2008 | Kuroda et al. |
| 7,446,721 | B2 | 11/2008 | Eom |
| 7,511,677 | B2 | 3/2009 | Waltman |
| 7,522,115 | B2 | 4/2009 | Waltman |
| 7,526,249 | B2 | 4/2009 | Waltman et al. |
| 7,982,687 | B1 | 7/2011 | Santoru |
| 8,068,053 | B1 | 11/2011 | Stutzke |
| 8,086,053 | B2 | 12/2011 | Kim et al. |
| 8,576,132 | B2 | 11/2013 | Lier |
| 8,599,085 | B2 | 12/2013 | Buer et al. |
| 8,604,989 | B1 | 12/2013 | Olsen |
| 8,760,354 | B2 | 6/2014 | Clymer et al. |
| 8,854,271 | B2 | 10/2014 | Cox et al. |
| 8,982,004 | B1 | 3/2015 | Santoru et al. |
| 9,196,967 | B2 | 11/2015 | Huang et al. |
| 9,203,162 | B2 | 12/2015 | Kyhle |
| 9,590,300 | B2 | 3/2017 | Artemenko et al. |
| 9,620,855 | B2 | 4/2017 | Driscoll et al. |
| 9,722,316 | B2 | 8/2017 | Haziza |
| 10,116,051 | B2 | 10/2018 | Scarborough et al. |
| 10,122,085 | B2 | 11/2018 | Goyette et al. |
| 10,158,177 | B2 | 12/2018 | Cook |
| 10,199,734 | B2 | 2/2019 | Eom et al. |
| 10,411,343 | B2 | 9/2019 | Driscoll et al. |
| 2005/0280593 | A1 | 12/2005 | Cha et al. |
| 2007/0126652 | A1 | 6/2007 | Wolfenden et al. |
| 2015/0048963 | A1* | 2/2015 | Dieterle .................. H01Q 3/14 342/5 |
| 2015/0116155 | A1 | 4/2015 | Chibane et al. |
| 2016/0079682 | A1 | 3/2016 | Chang et al. |
| 2016/0087344 | A1 | 3/2016 | Artemenko et al. |
| 2017/0084994 | A1 | 3/2017 | Tran |
| 2019/0131704 | A1 | 5/2019 | Urzhumov |
| 2019/0157765 | A1 | 5/2019 | Eom et al. |
| 2019/0245269 | A1 | 8/2019 | Blanda et al. |

FOREIGN PATENT DOCUMENTS

| | | |
|---|---|---|
| KR | 100679571 | 1/2007 |
| WO | 89/01246 | 2/1989 |
| WO | 92/13373 | 8/1992 |
| WO | 02/071545 | 9/2002 |
| WO | 2008/044062 | 4/2008 |
| WO | 2011/014919 | 2/2011 |
| WO | 2012/129240 | 9/2012 |
| WO | 2012129240 | 9/2012 |
| WO | 2017182612 | 10/2017 |

OTHER PUBLICATIONS

Thorlabs—M4 Tweaker Plate, 2.5mm 350-700nm, Notes/Specifications, 1999.
International Search Report and Written Opinion for PCT Application No. PCT/IB2021/051453, dated Jun. 1, 2021.
Non-Final Rejection issued in U.S. Appl. No. 17/182,992, dated Dec. 22, 2021.
Notice of Allowance issued in U.S. Appl. No. 17/182,992, dated May 27, 2022.

\* cited by examiner

Figure 1 – PRIOR ART

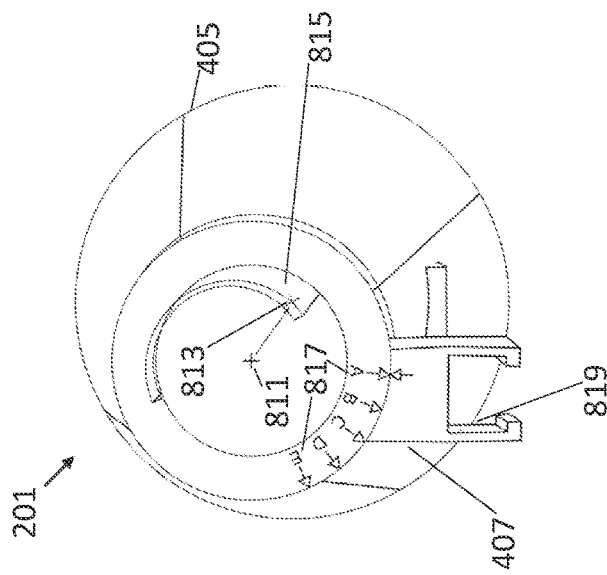
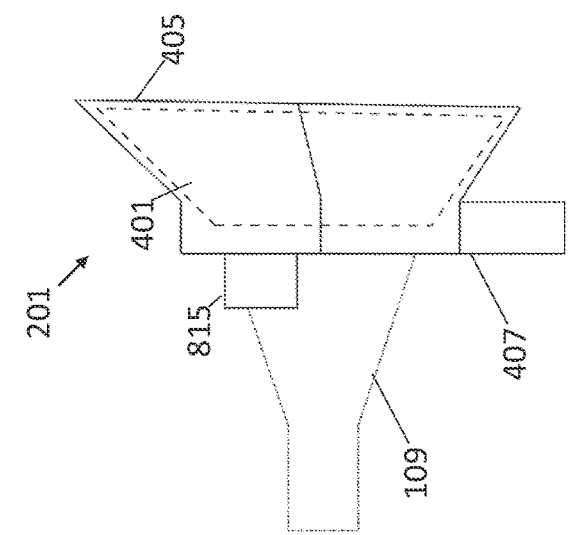
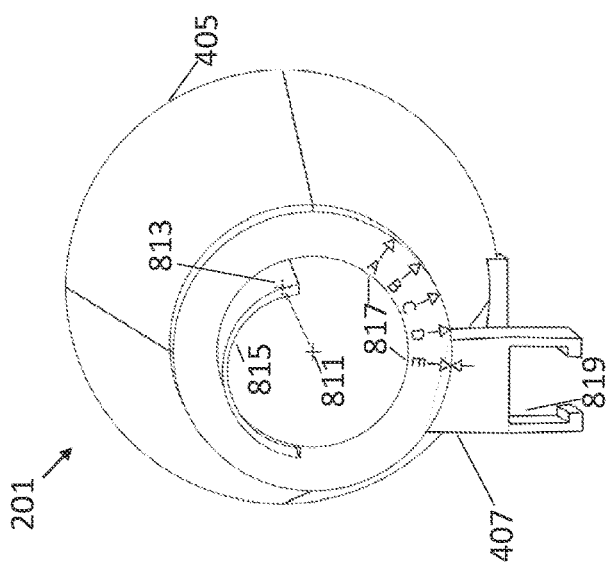

PRISM FOR REPOINTING REFLECTOR ANTENNA MAIN BEAM

RELATED APPLICATIONS

This application is a continuation of U.S. patent application Ser. No. 17/182,992, filed on Feb. 23, 2021, which claims the benefit of priority of U.S. Provisional Application No. 62/981,367, filed on Feb. 25, 2020, the contents of both of which are relied upon and incorporated herein by reference in their entirety.

BACKGROUND

The following references are herein incorporated by reference: U.S. Pat. No. 6,075,497, Chen et. al., "Multiple-feed Electromagnetic Signal Receiving Apparatus," filed Jun. 30, 1997, granted Jun. 13, 2000; U.S. Pat. No. 9,722,316, Haziza, Dedi David, Horn lens antenna, filed Jul. 7, 2014, granted Aug. 1, 2017; U.S. Pat. No. 10,158,177, Cook, Scott, "Antenna horn with suspended dielectric tuning vane," filed Mar. 11, 2016, granted Dec. 18, 2018.

Satellite communications at microwave frequencies, whether unidirectional or bidirectional, allow large quantities of data to be distributed across large geographic regions, but require large antennas that must be precisely pointed at the desired satellite in order to maintain a high signal strength. The most common satellite antenna for microwave (C, X, Ku, Ka, and higher bands) applications is a horn-illuminated reflector, either a center-fed or offset-fed parabolic (or nearly parabolic) reflector, of which a wide variety of shapes, sizes, and operational frequencies are available.

Mobile platforms and ground terminals that are used to communicate with non-geostationary orbit (NGSO) satellites will typically have motorized tracking systems and electronics to maintain the connection while either the ground terminal or satellite is in motion relative to the other. However, this hardware is very expensive. For a stationary ground location communicating with a GEO (Geostationary Earth Orbit) satellite, a fixed antenna that is pointed at the satellite once and then locked in place is cost effective and simple. However, the disadvantage of the fixed reflector is that changing the satellite to which the antenna is connected requires skilled or semi-skilled labor and tools to accomplish. This reduces the ability of the subscriber to change their service provider or broadcaster, and also restricts the ability of the service provider or broadcaster to change satellites or operators for capacity, commercial, or other reasons. It is desirable that, while the terminal and antenna costs remain low for the mass market, there is an easy way for the subscriber to repoint their own antenna from an original incumbent satellite to a new satellite, without tools, tuning, or significant effort.

This present disclosure introduces a system and method by which a microwave prism or lens can be used by an unskilled person on a reflector antenna by snapping to or otherwise mating with the horn in a controlled orientation to point the main beam of the reflector to connect to a different satellite.

Referring to FIG. 1, parabolic reflector antennas 101 for SATCOM purposes have at a minimum of a piece of shaped metal or conductive material reflector 103 in the shape of a paraboloid, a horn antenna 109 that serves to feed or illuminate the reflector 103, as well as support structure 105, 107 to mount the components in the correct relative positions and fix the entire assembly to point rigidly at the satellite. A radome or cover 111 over the mouth of the horn protects it from water or debris incursion. Some antennas will include additional shaped or parabolic subreflectors in the beam path to better control the illumination of the primary reflector, and/or modify the shape of the primary reflector. The very low-cost antennas for Ku and Ka DTH most typically use an offset-fed reflector, which reduces the blockage caused by the feed horn. The feed horn will commonly be highly integrated with the Low-Noise Block (LNB) Downconverter circuitry 113, and with a mounting arm supporting the LNB and feed. A pole- or wall-mounting fixture is included on the back of the reflector that allows the orientation of the reflector and feed assembly to be adjusted and then locked into place by means of bolts or other fasteners.

New subscribers of a broadcast or bidirectional satellite service either purchase the antenna 101 or are provided the antenna 101 as part of the service. Although at times advertised as being able to be installed and pointed by the subscribers themselves, installation by a service provider is almost universal.

The reflector 103, although presumably mounted to a solid structure and securely locked in place, can still become moved out of position by wind, snow, or other events. Correcting this problem requires a truck roll, which means sending a technician with training and tools to correctly re-point the antenna. Service visits represent a significant expense to the service provider, even when the issue may take only a few minutes to resolve.

Changing which satellite is connected when the antenna is not configured with multiple pre-pointed receivers requires both knowledge, tools, and skills. Currently, there are smartphone apps and websites that provide direction for how to point a satellite antenna, but the majority of subscribers would not be interested in doing so themselves. For this reason, service providers are locked into particular orbital slots by their subscriber base—the more successful the broadcaster, the less flexibility they have when trying to provide or modify the satellite from which they provide their service.

Microwave lenses and prisms constructed from dielectric, metamaterial, or metasurfaces are commonly used to control the radiation patterns or direction of antennas. Microwave lenses use the same principles as optical lenses, but use materials that have desirable properties for radio frequencies rather than optical wavelengths. Different features and methods have different benefits. Anti-reflective coatings are commonly but not universally used, typically in microwave lenses implemented as a quarter-wave plate or coating over the lens. An anti-reflective coating serves to improve the impedance match of the signal travelling from free space into the lens material, and again to improve the impedance match of the signal exiting the lens. Due to the difficulty of achieving the low dielectric constants needed for a good anti-reflective coating, there are many methods of constructing such lenses, including the use of foams, textured surfaces, and 3D printing.

Beam shifters are common devices in optics, composed of a polished parallel-plate prism, which could also be described as a slab of glass. When rotated at various angles relative to an incident light beam, the exit point of the light from the prism is laterally shifted by a distance related to the incidence angle of the light and the thickness of the prism. Such devices will include an optical anti-reflective coating, and are used as adjustment points in optical and laser workbenches to align different parts of the system. A typical example is provided by Thorlabs XYT/M-A Post-Mountable Tweaker Plate, 2.5 mm thick (Optical Beam Shifter), thorlabs.com.

SUMMARY

A reflector antenna repointing device for use with a reflector antenna. The reflector antenna repointing device has a microwave prism receiving input fields and providing output fields. The device also has a mounting structure configured to connect the prism to the reflector antenna. And, the device has adjustable alignment features at the mounting structure to set an adjustable position and adjustable orientation of the microwave prism relative to the reflector antenna, wherein the alignment features define a lateral shift of the output fields relative to the input fields.

BRIEF DESCRIPTION OF THE DRAWINGS

FIG. 8(a) shows how the mounting of the prism allows the same prism to support multiple scan angle adjustments, with the alignment and prism in a first position E.

FIG. 8(b) is a side view of FIG. 8(a).

FIG. 8(c) is similar to FIG. 8(a) with the alignment and prism in a second position A.

DETAILED DESCRIPTION

Figure 1:
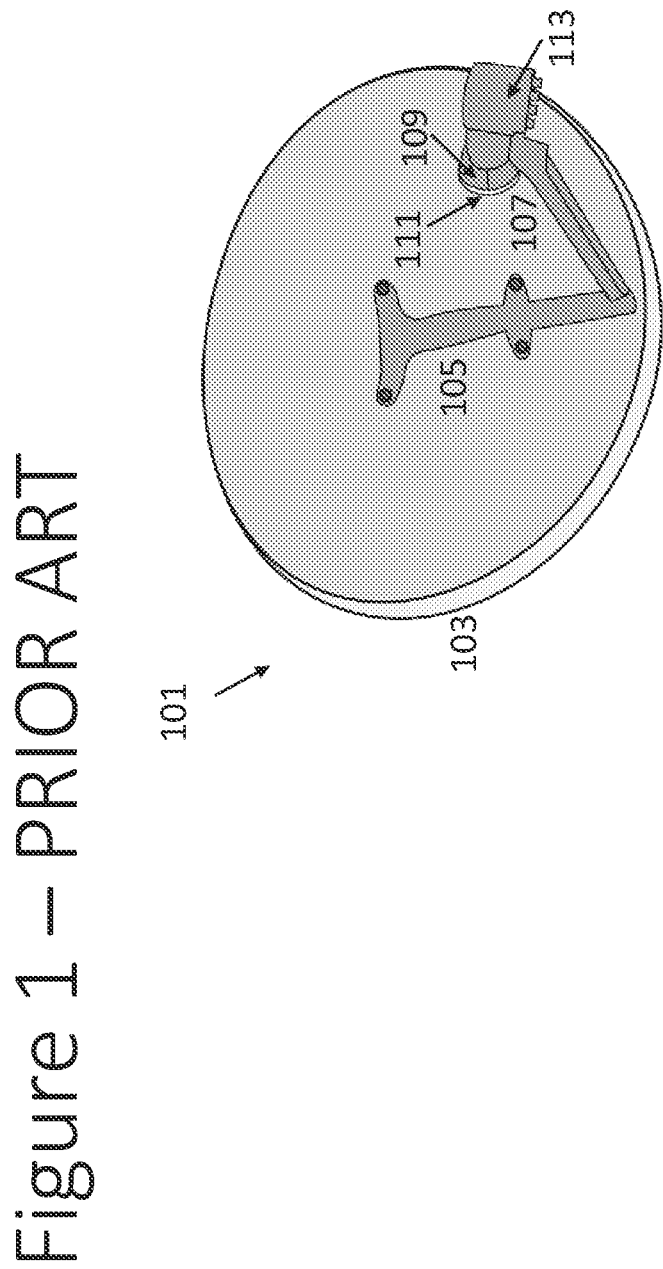
FIG. 1 shows a conventional parabolic reflector antenna.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 2:
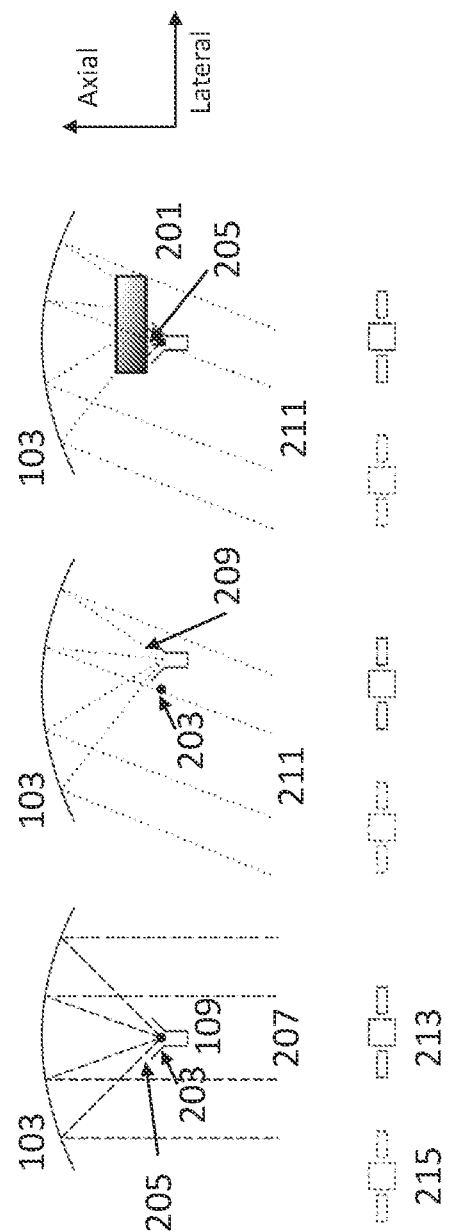
FIGS. 2(a)-2(c) illustrate the principle of repointing the beam from a reflector from an incumbent to a new target satellite using a prism.
Figure 3:
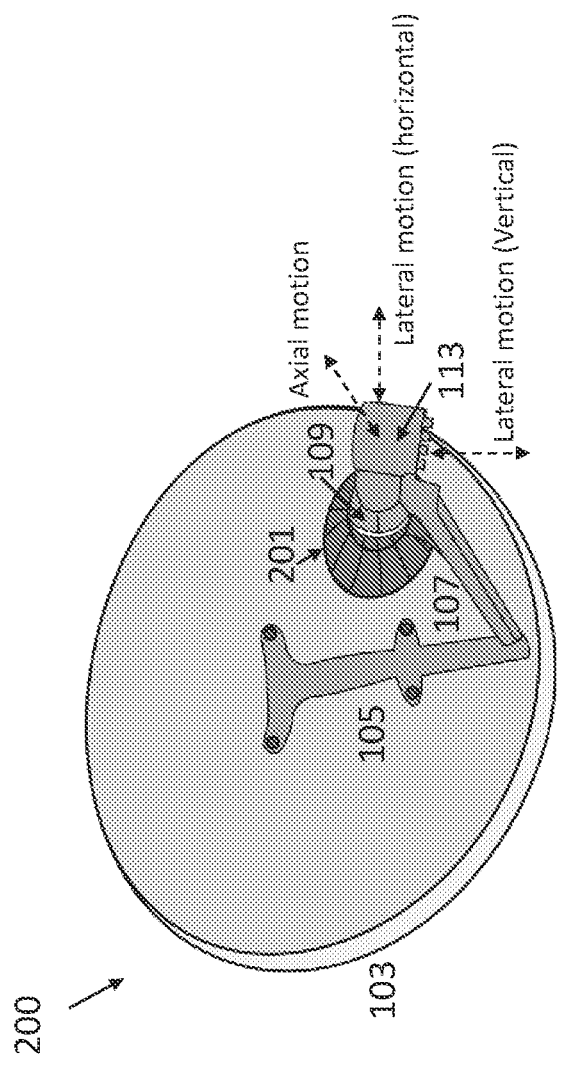
FIG. 3 shows a parabolic reflector antenna equipped with a re-pointing prism snapped into place over the receiver.

Turning to the drawings, FIG. 3 shows a reflector antenna 200 having a reflector repointing device 201. The reflector repointing device 201 enables the main beam of a reflector antenna 200 to be steered by a fixed and determined angle relative to the original angle of the antenna 200 without the repointing device 201 installed. The reflector repointing device 201 is installed over the reflector's feed horn 109 in a position and orientation controlled by the device itself. The position and orientation are set such that for a reflector antenna 200 within a given geographic location already pointed at a specific satellite 213 (FIG. 2(a)), the installation of the reflector repointing device will convert the antenna to instead point at a separate, specific satellite 215 without physically moving the reflector 103 or the feed horn 109. Separate devices 201 or different orientations of the same device 201 can enable scanning within a range of +/− 10 degrees from the nominal angle. This is not a hard limit, but further scanning will result in more significant performance degradation compared to the nominal case without the reflector repointing device installed. As a specific example, an antenna 200 located within 50 miles of (for example) Washington DC and configured to receive signals from a satellite at 50° W could be converted to instead receive signals from a satellite at 45° W, without skilled installation or pointing calibration, by installing the device 201 specifically designed for a 5 deg shift over the feed 109.

For convenience, the following sections describe signals and fields as being transmitted from the antenna and reflector towards one or another satellite. The reciprocal behavior of transmission from the satellite and reception by the antenna is not described, but is exactly analogous to the described case.

Referring to FIG. 2(a), the horn antenna 109 when in typical operation is sited such that the aperture of the horn is located at the focal point 203 of the parabolic reflector 103. In typical operation shown in FIG. 2(a), the system 101 is oriented such that the signals or antenna fields 205 from the horn interact with the reflector 103 and are directed towards the desired target satellite 213, forming a beam 207. Referring to FIG. 2(b), steering the system 101 to form a beam 211 towards a different satellite 215 can be performed by reorienting the entire antenna 101, but can also be performed by shifting the feed horn 109 away from the focal point 203 of the reflector 103. The antenna fields 209 from the offset horn then interact with the reflector 103 to form a beam 211 directed at the alternate satellite 215. However, either re-orienting the entire antenna 101 or physically moving the horn 109 both require skilled labor to perform, as well as support for the movement in the design of the reflector, neither can easily be performed without tools as a retrofit operation in most cases.

Figure 4:
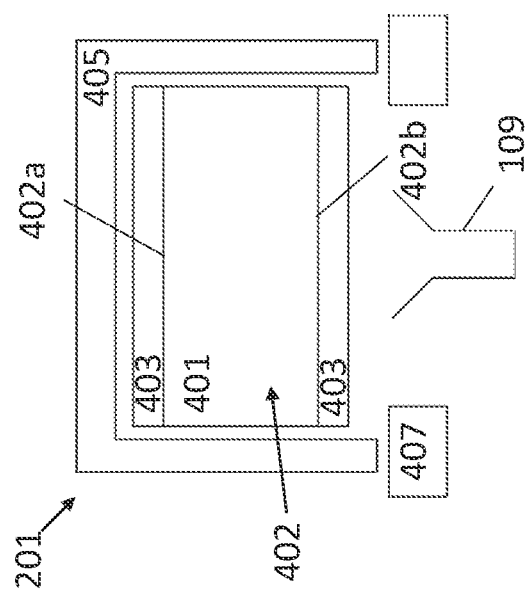
FIG. 4 shows the components of the system.

Turning to FIGS. 2(c), 3, the reflector repointing device 201 is added to the horn 109 at the focal point 203 of the reflector 103 to laterally shift the fields 205 that would ordinarily direct a beam 207 at the original satellite 213 to instead produce a beam 211 at the alternate satellite 215. Here a lateral shift indicates a direction perpendicular to the axis of symmetry of the parabolic reflector, which is also the direction of the feed support arm. A lateral shift could be horizontal, vertical, or a combination of both, but should remain within the plane aligned with the original feed aperture perpendicular to the reflector axis to ensure that the apparent phase center continues to lie approximately on the focal plane of the reflector 103. The location of the feed aperture defines the starting point for comparison for all shifts. Laterally shifting and potentially correcting the angle of the fields effectively forces the reflector 103 to behave as though the horn 109 was in a different location, thus generating a beam 211 in a new, desired direction. Referring now to FIG. 4, the reflector repointing device 201 has a microwave prism or prism 401 with optional anti-reflective coating features 403 at one or both surfaces (the top and bottom surfaces in the embodiment of FIG. 4) of the prism 401, a mounting system or features 407 designed to connect and secure the prism to the host horn 109, and a radome or other cover 405 for protection against the elements. All of the terms microwave prism, prism, microwave lens, and lens are intended to be applied to the device 401, and the term prism is used in this disclosure to include microwave prisms.

The construction of the microwave prism has many similarities in practice and principles with that of microwave lenses, including GRIN lenses. A prism indicates a refractive device with a primary purpose of bending or shifting a beam or cone, beam, or other distribution of electromagnetic energy, while a lens indicates a refractive device with a primary purpose of expanding or contracting a cone, beam or other distribution of electromagnetic energy. There is not a strict separation between these two concepts, as a prism can also be designed to focus, and a lens can also be designed to bend the energy. For this disclosure, prism is deemed more meaningful, as the primary purpose of the device 401 is to bend and shift energy, rather than expand or contract, although some expansion and contraction may be included as well.

The prism 401 and mounting features 407 are specific to a particular make or model of reflector antenna 101 and the accompanying horn 109, and will also be specific to particular satellites 213, 215. The mounting features 407 can be, for example, fasteners (such as bolts, nuts, screws), or adhesives.

As shown in FIG. 4, in one embodiment, the microwave prism 401 has a body 402 with a first prism surface 402a and a second prism surface 402b opposite the first surface 402a. The prism body 402 has a top, bottom, and at least one side, and can have a cross-section of any suitable shape, such as circular, square, or rectangular. The first prism surface 402a is at the top of the body 402 and the second prism surface 402b is at the bottom of the body 402. The first and second prism surfaces 402a, 402b are planar. The anti-reflective coating features 403 can be a coating that is applied to the first and second prism surfaces 402a, 402b. In one embodiment, the anti-reflective coating features have a top coating surface and a bottom coating surface, and a first coating feature 403a has a bottom coating surface that contacts the top prism surface 402a of the prism body 402, and a second coating feature 403b has a top coating surface that contacts the bottom prism surface 402b of the prism body 402.

In the embodiment of FIG. 4, the prism is a parallel-plate prism. The first prism surface 402a is parallel to the second prism surface 402b. In addition, the flared sides of the horn 109 form a forward open mouth, and the forward edges of the flared sides form a forward perimeter that is planar. The horn 109 also has a central longitudinal axis that extends from the back of the horn to the front of the horn. The first and second prism surfaces 402a, 402b are substantially parallel to the planar mouth of the horn 109, and orthogonal to the longitudinal axis of the horn 109.

In one embodiment, the horn 109 and the reflector repointing device 201 can instead be connected to a common support, such as a frame or housing, and the mounting system or features 407 can connect the reflector repointing device 201 to the support and not to the horn 109.

Figure 5:
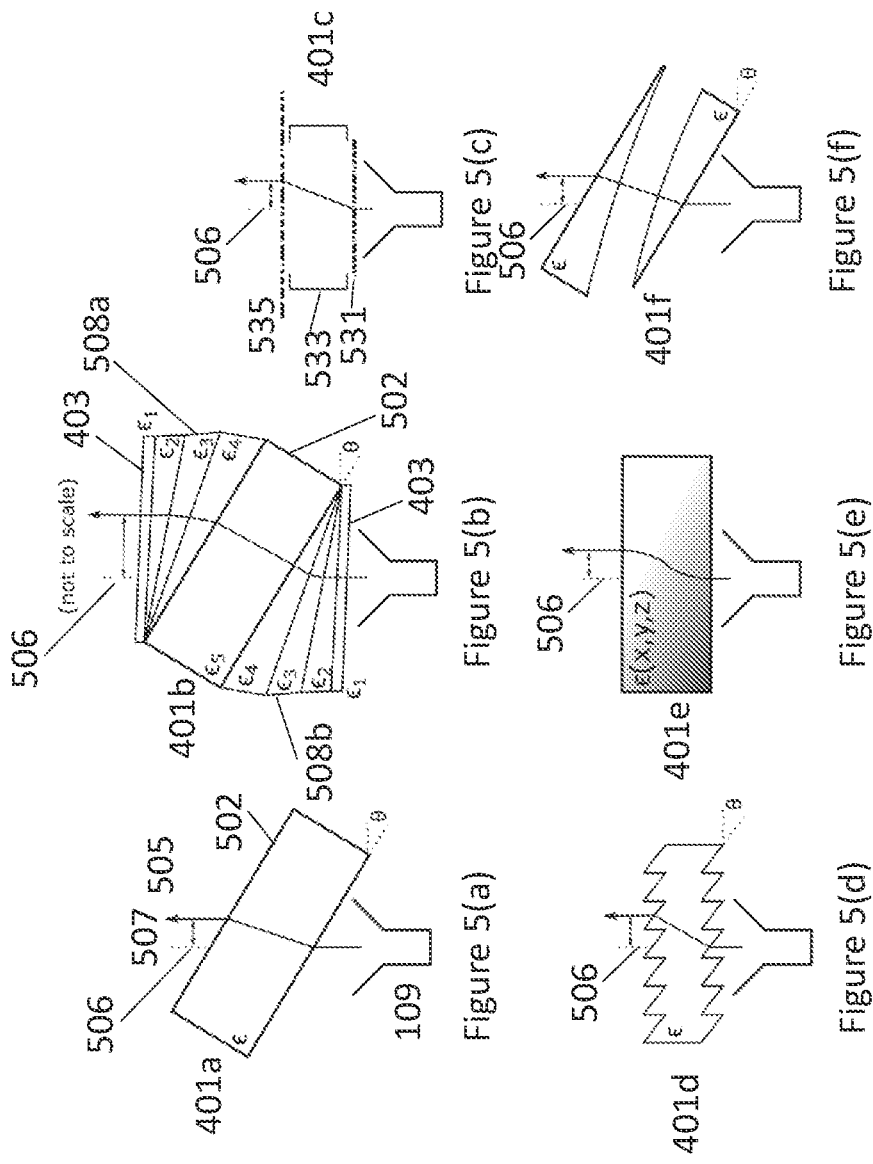
FIGS. 5(a)-5(f) show multiple candidate prism implementations.

The prism 401 functions by being positioned close to or at the aperture of the horn antenna 109 at a prescribed orientation, enforced by the mounting features 407. In FIG. 5, the prism 401, when appropriately positioned, produces a lateral offset 507 in the corresponding position of the input and output fields 505 entering and exiting the device, with respect to an original or undisturbed field position 506 of the antenna fields from the horn 109 in the absence of a prism 401.

The antenna fields emanating from the feed horn are not as highly collimated as those coming from a laser (due to the much longer wavelength of microwaves compared to the short wavelength of laser light), and instead the fields are expanding in a spherical or conical fashion between the feed horn 109 and reflector 103. Due to this difference between lasers and microwaves, so the reflector repointing device 201 can include corrections to allow for the cone-shaped emanation of energy coming from the horn, unlike the simple planar beam shifters for optical purposes. For example, the reflector repointing device 201 can have a non-planar surface (in particular, the bottom prism surface 402b and/or the top prism surface 402a) for nonzero optical power to correct the field curvature and axial location of the effective phase center of the output fields coming out of the repointing device 201.

The core operation of the prism 401 is to shift the fields laterally compared to the location of the horn 109. That can be implemented in any suitable manner, some examples of which are shown and described in the embodiments of FIGS. 5(a)-5(f) as various configurations for the reflector repointing device 201.

Referring to FIG. 5(a), the simplest option is for the microwave prism 401 to be configured as an optical beam shifter or parallel plate prism 401a formed of a uniform high dielectric constant. The prism 401 is held at a prescribed angle relative to the horn antenna 109, and more specifically the first and/or second surfaces 402a, 402b are at an angle with respect to the plane of the open mouth of the horn 109 and at an angle with respect to the central longitudinal axis of the horn 109. This can optionally include anti-reflective layers 403 to support higher performance. However, to create a large lateral shift or offset 507, this embodiment might require the prism to be very thick, have a high angle of incidence of the fields (which limits the transmission efficiency), and a large dielectric constant $\varepsilon$. These factors combined to make the prism option 401a bulky and heavy.

In FIG. 5(b), another prism 401b includes coupling and antireflective layers to more smoothly convert the direction of the signal throughout the structure with a series of one or more wedges 508. The prism 401b has a central body or plate 502 having a parallel shape, as with the prism 401a, and one or more wedges 508 are connected (e.g., by adhesive) or integrally formed thereto extending outward from the top and/or bottom of the central plate 502. A first set of one or more wedges 508a are arranged at the first side (the top) of the main body 502, and a second set of one or more wedges 508b are arranged at the second side (the bottom) of the main body 502.

The wedges 508 can have any suitable shape. However, in the embodiment shown, each wedge 508 is substantially triangular in shape with a first planar primary surface that faces the main body 502, a second planar primary surface that faces away from the main body 502, and a small secondary surface. The bottom surface of the bottommost wedge of the first set of wedges 508a, contacts the top surface 502a of the main body 502, and the top surface of each wedge contacts the bottom surface of the adjacent wedge. The top surface of the topmost wedge of the second set of wedges 508b, contacts the bottom surface 502b of the main body 502, and the bottom surface of each wedge contacts the top surface of the adjacent wedge. Each wedge has an acute angle formed between the first and second primary surfaces. In one embodiment, the first set of wedges 508a have a combined angle that can be the same as the offset angle θ of the bottom surface 402b of the main body 502 with respect to the plane of the mouth of the horn 109. And the second set of wedges 508b have a combined angle that can be the same as the offset angle θ of the top surface 402a of the main body 502 with respect to the plane of the mouth of the horn 109. Accordingly, the bottom wedge surface of the bottommost wedge 508b of the lower wedge set is substantially parallel to the plane of the horn mouth and to the top wedge surface of the topmost wedge 508a of the top wedge set. Thus, the acute angle of the top set of wedges 508a is aligned at one side of the main body 502 (i.e., the left side in the embodiment of FIG. 5(b)), and the acute angle of the bottom set of wedges 508b is aligned at the opposite side of the main body 502 (i.e., the right side). In this configuration, the signal emerges substantially parallel to and offset from the original signal axis 506, which can also be parallel to the central horn longitudinal axis.

In one embodiment, the multiple dielectric layers $\varepsilon_1$, $\varepsilon_2$, $\varepsilon_3$, $\varepsilon_4$, and $\varepsilon_5$ for each wedge 508 are successively higher in dielectric constant the further from the central plate 502, with $\varepsilon_1$ the lowest and $\varepsilon_5$ the highest. That is, the central plate 502 has the highest dielectric constant, and each adjacent wedge 508 from the central plate 502 has a successively lower dielectric constant. This design allows increased transmission efficiency with the increased number of layers and much smaller field incidence angle at each layer but does little to minimize the size and mass of the design. Thus, each wedge 508 refracts the signal. And each wedge 508 of the bottom wedge set 508b incrementally increases the angle of the signal with respect to the original axis 506. And each wedge 508 of the top wedge set 508a reduces the angle of the signal with respect to the original axis 506 until the signal is substantially parallel to the original axis 506 or is otherwise at the desired angle with respect to the original axis 506. An anti-reflective coating 403 can be placed at the top of the top wedge 506a and at the bottom of the bottom wedge 506b.

Turning to FIG. 5(c), a prism 401c is shown with metamaterial and metasurface technology, which also can include transmit array concepts. This embodiment reduces the mass of the prism 401c by reducing the volume of required material, but with a corresponding reduction in the operational bandwidth and an increase in insertion loss. Rather than use bulk dielectric whose properties are defined by the dielectric constant and the shape, a metasurface prism has one or more layers of metamaterial or metasurface suspended in air by a supporting structure. For this implementation, a prism 401c may be constructed from two layers 531, 535 of a spatially varying metamaterial or metasurface that changes the direction of the fields from the horn 109 at two points by introducing a phase gradient in the transmitted fields. The metamaterial or metasurface prism does not rely on refraction within a dielectric region as does a conventional prism, and does not include the dielectric regions included in 401a and 401b. Accordingly, the bottom metamaterial or metasurface 531 refracts the signal away from the original signal axis 506 so that the signal travels at an angle with respect to the original signal axis 506. And the top metamaterial or metasurface 535 refracts the signal back to being parallel to the original signal axis 506. The double refraction offsets the signal from the original signal axis 506 and parallel thereto.

A gap or separation between the two layers 531, 535 is required to allow distance for the fields to propagate and create the lateral offset. The greater the separation, the greater the lateral offset. The separation is maintained by a mechanical structure 533 internal to the prism structure that maintains the space between the layers 531, 535 as an air gap. For example, the mechanical structure 533 can be a support or beam and one or both of the layers 531, 535 can be connected to the support at different positions that maintains the desired air gap distance between them. This supporting structure internal to the prism is separate in purpose and implementation from the structure 407 that holds the prism 401 to the feed 109, and can be implemented using supports, bolts, clips, or other physical features to maintain a fixed spacing between the two layers 531 and 535. The artificial dielectrics or metasurface structures forming the layers 531 and 535 require periodic changes to their structure across the surface of each layer 531 and 535 to set up a phase gradient across the surfaces and therefore steer the beam, which limits the usable bandwidth of the design. Metamaterial and metasurface designs are often narrowband and lossy, but for some applications may be sufficient. Transmission efficiency through both layers is a key metric for this style of implementation.

In FIG. 5(d), a corrugated prism 401d is shown that reduces the thickness of the structure. That, in turn, reduces the weight, since the supporting structure 407 and radome 405 can then be smaller as well. The large height of the prisms shown in 401a and 401b is also reduced by introducing shaped corrugations to the top and bottom surfaces of the prism 401d. The corrugations have a sawtooth type shape. From the left, each tooth of the top surface has a straight leading rising edge that is substantially parallel to the longitudinal axis of the horn, followed by an angled trailing falling edge.

The prism 401d shows a collapsed version of the prism 401a, but the same approach could be applied to the multilayer 401b. Collapsing the size and shape of the prism by using a Fresnel-style corrugation in the top and bottom surfaces 401d can maintain largely the same beam steering properties, but with a reduced height of the prism. This will produce dispersive effects that limit the operational bandwidth, but is likely to have smaller dispersion than the metasurface/metamaterial approach. An antireflective coating can be applied to the top and bottom corrugated surfaces of 401d, and will follow the shape of the corrugations itself. The bottom surface refracts the signal to form an angle with respect to the original signal axis 506, and the top surface refracts the signal back to being parallel to (and offset from) the original signal axis 506.

In FIG. 5(e), a graded-index or inhomogeneous prism 401e, with full control over the internal dielectric constant $\varepsilon(x,y,z)$ offers significant benefits of collapsing functionality into the smallest possible contiguous package. The challenge in both smoothly varying (continuous) as well as stepped gradient designs is fabrication of the often complex shapes and structures required to achieve the necessary performance.

With reference to FIG. 5(f), two half-prisms 401f are shown. Since the mass of the prism 401 is a major factor in the design of the repointing device 201, other actions to reduce the mass of the prism can be taken, including prisms where regions of dielectric in the interior of the prism are removed when unnecessary, effectively forming two half-prisms 401f that are separated from one another by a distance or gap of air. In some implementations, this gap might be implemented a hollow air region might be constructed within an otherwise solid prism, reducing the weight but not requiring a separate mounting or support structure similar to support 533. The half-prisms 401f can have the shape of a triangle, with planar or curved surfaces. As shown, the upper half-prism can have an inward-facing surface that is curved to be slightly concaved, and the lower half-prism can have an inward-facing surface that is curved to be slightly convex. The inward-facing surface of the upper half-prism faces and has a mating shape with the inward-facing surface of the lower half-prism. Matching the profile of the inner surfaces of the prism to the propagation direction of the fields at each angle allows the fields to continue straight without refraction at the interface, as though the removed material were still there. This mass-reduction approach is also useful when the loss tangent of the available dielectrics is high compared to air. The bottom surface of the lower half-prism 401*f* is angled θ with respect to the plane of the horn mouth, and refracts the signal to be at an angle with respect to the original signal axis 506. The top surface of the lower half-prism 401*f* further refracts the signal. The bottom surface of the upper half-prism 401*f* refracts the signal back toward being parallel to the original signal axis 506, and the upper surface of the upper half-prism 401*f* further refracts the signal to be parallel to and offset from the original signal axis 506. The greater the distance between the upper and lower half-prisms 401*f*, the greater the achievable lateral offset of the signal from the original signal axis 506.

Because the fields propagating through a dielectric region will not expand by as much as if they were propagating only through air, the effective phase center of the fields coming from the device 201 may no longer match the reflector. Even though the lateral position may be correct, the distance of the phase center of the feed distribution to the reflector still needs to match the focal length of the reflector to maintain aperture efficiency. The inclusion of nonzero optical gain (through curvature of the surface(s) or interior dielectric gradients) can be used to correct both the angular distribution of the fields as well as the effective phase center.

The required size of the prism 401 is determined jointly by the degree of lateral shift needed for the fields and the geometry of the reflector. A good prism should be small, lightweight, and compact in order to minimize cost and simplify installation. However, the prism 401 must be sized to intercept all of the power from the feed horn and redirect all of that energy to the reflector.

Figure 6:
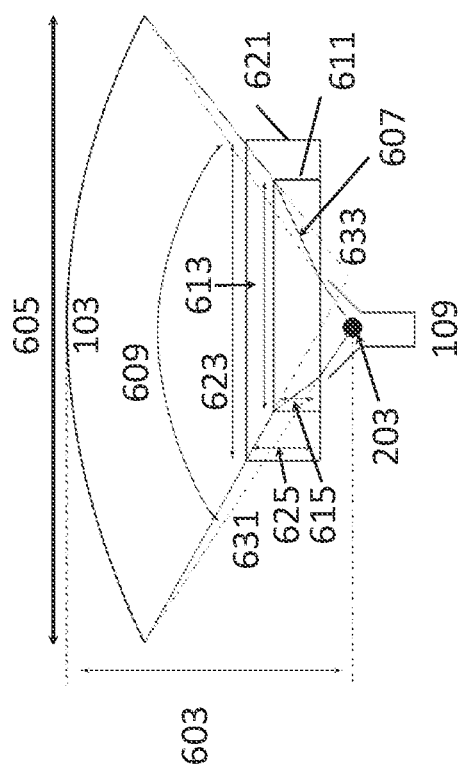
FIG. 6 shows the geometric considerations for the prism size and structure.

Referring to FIG. 6, for reflectors with a small f/D (focal length 603 to diameter 605) ratio, or equivalently a wide illumination cone angle 609, a particular prism 611 implementation of a certain thickness must be large enough in the lateral directions to cover the original radiation pattern cone 631 from the horn at the base of the prism, large enough at the exit of the prism 611 to release energy across the entire surface of the re-centered cone 633, and allow for enough internal thickness 615 and width 613 to reshape the energy sufficiently to follow the desired path 607. If a thicker 625 prism 621 implementation is required in order to provide the necessary lateral shift (in general, further shift requires a thicker prism to provide more room to propagate), then the prism (at least at the output) must be wider 623 as well, thus making the volume and mass of the prism proportional (roughly, in general) to the cube of prism thickness. This leads to the imperative requirement to minimize the prism thickness while achieving other performance parameters, so as to also control the mass.

The f/D ratio also affects the amount of lateral shift required to steer the reflector to a given angle. A reflector with a low f/D ratio, like many common consumer DTH antennas, allows a small change in effective feed position 109 to produce a larger shift in beam scan angle.

Reflectors with high f/D would require a smaller prism to shift the aperture fields by a given distance since the cone angle is small, but would require a larger physical shift to obtain the same scan angle of the main beam in degrees.

In one embodiment, the reflector repointing device 201 is retrofit to (and connected, such as by fastener mechanisms, adhesive or the like) existing horn antennas. Accordingly, it is configured to work with existing horn antenna and parabolic reflector. The properties of the prism 401 are designed to suit the antenna system 101. However, in other embodiments, the horn antenna and parabolic reflector can be designed to work with the device 201, which would involve mounting features 407 ready for easy and precise installation of the device 201, a strong mounting arm 107 (FIG. 1) to support the additional weight of the device 201 without deflection, and a sufficiently large f/D ratio to optimize the mass of the entire system 201. For a given pair of satellites, the incumbent satellite 213 and the new target satellite 215 (FIG. 2), the correction angle that must be applied by the reflector repointing device 201 and the direction relative to the current antenna pointing direction to which the offset should be applied is based on the angular distance between the two satellites and the location on the earth where the satellites are observed.

Figure 7:
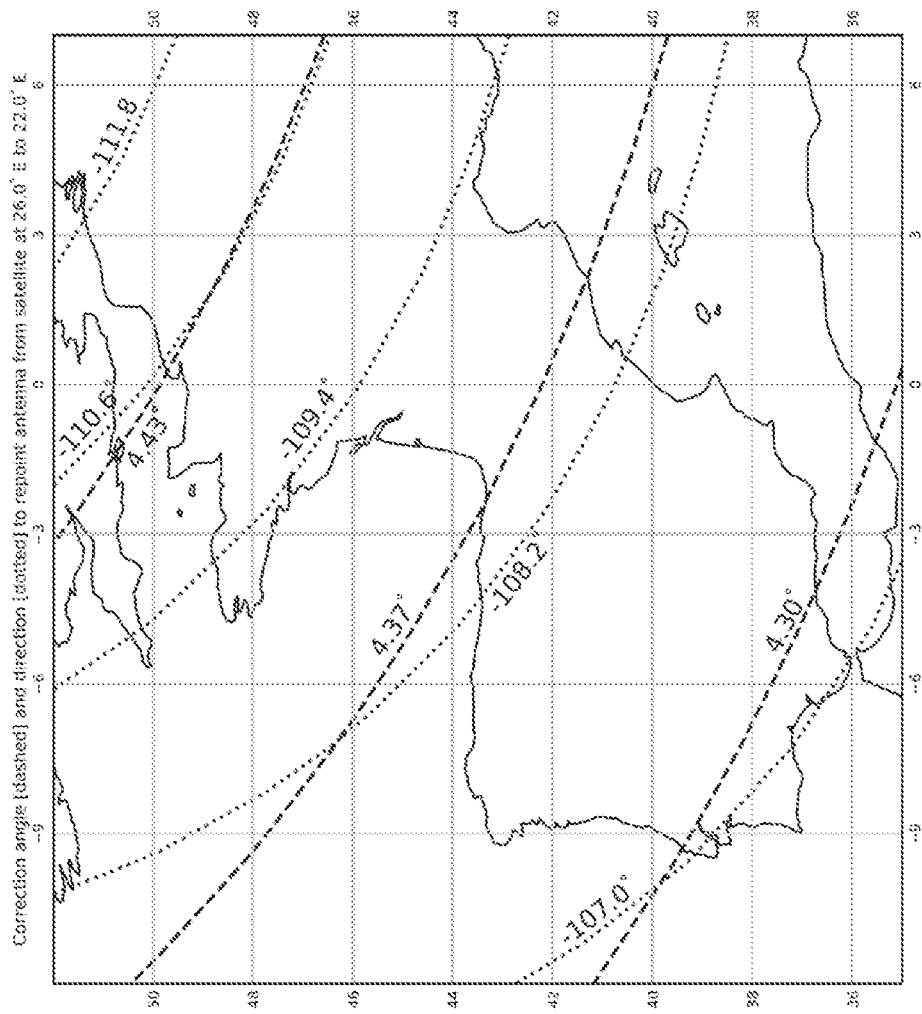
FIG. 7 shows the orientation and angle that the terminal must point relative to the original satellite for a representative pair of satellites serving a geographical region.

FIG. 7 shows the difference angles on the ground that must be applied. Since the relatively small-diameter reflectors 103 (typically between 40 and 80 cm) used for DTH have fairly broad beams, the resolution of the correction is quite coarse. Based on the location of a target installation of the reflector repointing device 201, a chart similar to that in FIG. 7 is consulted and the necessary correction angle and direction selected. The correction angle and direction are then applied by implementation in an independent prism and mounting design for each combination, or by means of an adjustable fixture or mounting arrangement the scan angle and direction are set appropriately using a single prism and fixture design for a broader geographic region. The prism is effectively rotated about the central axis of the horn antenna 109 by the correction angle in order to have the resulting beam be pointed at the target satellite based on the location of the system 200. The prism or setting selection can be performed before shipping the device to the end-user, or the end user can be provided the instructions to use a particular numbered or labeled setting depending on their location. i.e., the instructions might read, "For your postcode ABC, rotate the mounting clip to align the arrows with Position D before installing on your antenna".

These instructions would apply to an implementation illustrated in FIG. 8(*a*) and FIG. 8(*b*). A horn antenna 109 is shown mounted with its center at point 811. The prism 401 (shown for illustrative purposes only, but contained within the radome 405 of the device 201) shifts the fields of the horn to be re-centered to point 813 on leaving the prism. A set of detents and alignment markings are provided on the outer housing or radome material to be adjustably aligned either by the end user or before shipping. The alignment markings allow the user to adjust the mounting structure to set an adjustable position and adjustable orientation of the microwave prism relative to the reflector antenna, and specifically relative to the horn feed 109. That is, the mounting structure 407 fixedly attaches the device 201 to the antenna 101, but at a position and orientation that is defined by the adjustable alignment markings. The alignment features define a plurality of positions and orientations of the microwave prism relative to the mounting structure, and can be set at the factory based on geographic location. The end user can then determine (such as by using the map of FIG. 7) the proper setting based on the geographic location of the installation location.

Changing the orientation of the prism 401 relative to the central axis of the feed horn 109 changes the angle of the re-steered beam relative to the original mounted antenna. For example, the prism can be rotated about the feed horn 109 central axis such that the resulting beam is pointed East or West of the original beam direction, as well as adjusting the elevation angle that the beam is pointed above the horizon to accurately point at the desired satellite 215. One or more support members or fastening members can be provided to move the prism 401. For instance, a fastening member can movably connect the prism 401 to the radome 405 or to the mounting structure 407 so that the prism 401 can change orientation relative to the feed horn 109.

FIG. 8(c) shows the device 401 aligned to position A, while FIG. 8(a) shows the device 401 aligned to position E. Here, it is noted that the signal that is emerges from the horn is offset by the prism, as shown in FIGS. 5(a)-(f). The alignment 817 can be connected to the prism 401, so that rotating the alignment 817 between the various positions, also rotates the entire prism 401. When the prism and alignment 817 are at position E (FIG. 8(a)), phase center 813 of the prism is offset from the phase center 811 of the horn. More specifically, the phase center 813 of the prism is at about 2 o'clock with respect to the phase center 811 of the horn. When the prism and alignment 817 are at position A (FIG. 8(c)), the phase center 813 of the prism is at about 4 o'clock with respect to the phase center 811 of the horn. Thus, the phase center 813 of the prism rotates as the alignment rotates, which in turn moves the signal that is output by the prism. In another embodiment, the different positions of the alignment can create different angles for the prism.

The prism 401 may take on any of the shapes or varying orientations with respect to the feed horn as previously described in FIGS. 4-6, and the shape and boundary of the radome is then selected to cover the prism appropriately.

After aligning the adjustable alignments 817, the device would fixedly connect to the horn in any suitable manner. For example, the mounting system 407 can include a snap connector 819 that snaps onto the mounting bar of the antenna, stabilized and oriented by the horn shroud 815. Once installed, the device would now cause the reflector to point its main beam at the new desired satellite 215. The mounting features 407 fixedly hold the device in the proper position to intercept all of the fields from the horn 109 that would otherwise reach the reflector 103, and shift the fields laterally to effect a change in scanning angle of the reflector antenna 101. No further motion or activity is then required during proper operation of the antenna 101 and the device 201. If the antenna is desired to be repointed again at the original incumbent satellite 213, then the device 201 can be removed by detaching the mounting features 819.

It is noted that the drawings may illustrate, and the description and claims may use geometric or relational terms, such as right, left, above, below, upper, lower, side, top, bottom, elongated, parallel, laterally, orthogonal, angle, rectangular, square, circular, round, axis. These terms are not intended to limit the disclosure and, in general, are used for convenience to facilitate the description based on the examples shown in the figures. In addition, the geometric or relational terms may not be exact. For instance, signals and planes may not be exactly perpendicular or parallel to one another but may still be considered to be perpendicular or parallel.

The foregoing description and drawings should be considered as illustrative only of the principles of the disclosure. The system may be configured in a variety of shapes and sizes and is not intended to be limited by the embodiment. Numerous applications of the system will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A prism assembly comprising:
   a prism arranged between a horn antenna and a reflector;
   a mounting structure configured to moveably connect the prism to the horn antenna; and
   two or more alignment features configured to indicate a corresponding position and orientation of the connected prism relative to the horn antenna, wherein the position and orientation of the prism indicated by each of the two or more alignment features has a corresponding effect on a beam from the horn antenna directed to the reflector, and the position and orientation of the prism is selectably adjusted to align with one of the two or more alignment features.

2. The assembly of claim 1, wherein the horn antenna comprises a horn feed that outputs the main beam.

3. The assembly of claim 1, wherein the prism redirects the main beam from a first satellite to a second satellite.

4. The assembly of claim 1, wherein the prism is a parallel-plate prism.

5. The assembly of claim 1, wherein the prism includes one or more layers of metamaterial.

6. The assembly of claim 1, wherein the prism includes a graded-index structure.

7. The assembly of claim 1, wherein the prism is substantially enclosed by a radome.

8. A system for repointing a main beam of a reflector antenna, comprising:
   a prism configured to receive the main beam from a horn antenna and the prism configured to laterally shift the main beam from the horn antenna in a direction that is perpendicular to an axis of symmetry of a reflector that is parabolic, and to direct the laterally shifted main beam to the reflector; and
   a mounting structure configured to connect the prism to the horn antenna.

9. The system of claim 8, wherein the mounting structure releasably connects to the horn antenna.

10. The system of claim 8, wherein the prism is configured to repoint the main beam from a first satellite to a second satellite.

11. The system of claim 8, further comprising:
    one or more alignment features configured to set a position of the prism and an orientation of the prism.

12. The system of claim 11, wherein the one or more alignment features are adjustable.

13. A method for repointing a main beam of a reflector antenna, the method comprising:
    determining an output direction of the main beam from a horn antenna and determining an exit point of the main beam from the horn antenna;
    positioning a prism at the exit point to receive the main beam; and
    mounting the prism on the horn antenna to shift the main beam, between the exit point from the horn antenna to an output of the prism directed to a reflector, laterally in a direction that is substantially perpendicular to an axis of symmetry of the reflector.

14. The method of claim 13, further comprising:
    one or more alignment features configured to set a position of the prism and an orientation of the prism.

15. The method of claim 14, wherein the one or more alignment features are adjustable.

16. The method of claim 13, wherein the prism is a parallel-plate prism.

17. The method of claim 13, wherein the parallel-plate prism comprises a plurality of wedges.

18. The method of claim 13, wherein the prism is substantially enclosed by a radome.

\* \* \* \* \*